J. A. SHERRIFF.
LIGHTNING-RODS FOR OIL-TANKS.
No. 189,326. Patented April 10, 1877.
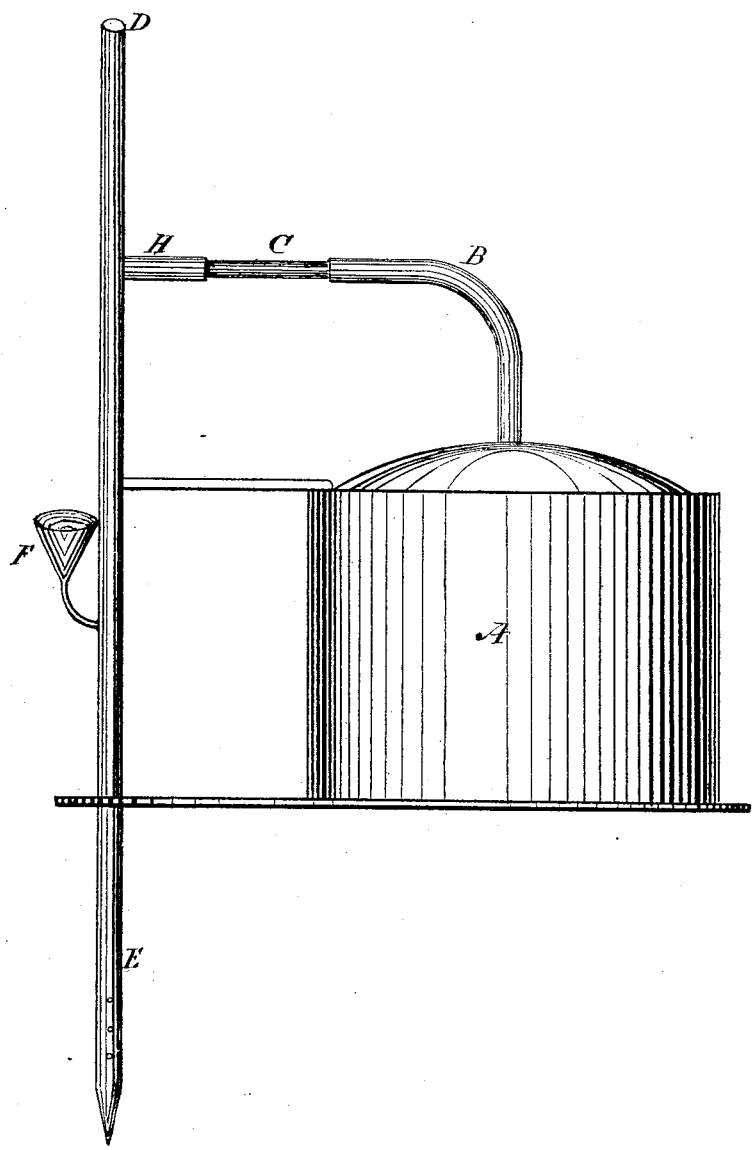

UNITED STATES PATENT OFFICE.

JAMES A. SHERRIFF, OF FRANKLIN, PENNSYLVANIA.

IMPROVEMENT IN LIGHTNING-RODS FOR OIL-TANKS.

Specification forming part of Letters Patent No. 189,326, dated April 10, 1877; application filed July 29, 1876.

*To all whom it may concern:*

Be it known that I, JAMES A. SHERRIFF, of Franklin, Venango county, Pennsylvania, have invented a Device for Protecting Oil-Tanks from Lightning, of which the following is a specification:

It is a well-known fact that oil-tanks, when filled with oil, are much more liable to be struck by lightning than when empty, and the reason is well understood, i. e., that when a tank is filled with oil and covered in the most secure manner, with earth on the top, and exposed to the heat of a summer's sun, that the more volatile portions of the oil pass off in a very light and highly inflammable gas, which rises up in the air until dissipated by the wind. This gas is principally carbureted hydrogen, and is a much better conductor of electricity than the air, so that on any summer day there is an invisible conductor of electricity extending from the tank to the region of the clouds, and when a storm-cloud passes over highly charged with electricity, the electric current is invited down this conductor to the tank, and, as the gas is set on fire before it reaches the tank, an ordinary lightning-rod is no protection. My invention is intended to give the protection which the lightning-rod fails to do.

In the drawing, A represents a tank filled with oil and covered. B is a tube from the top of the tank to convey off the gas. This tube may be of iron or any other suitable material. D E is an iron tube driven into the ground until the point E reaches water, or moist earth. The bottom of the tube is perforated with holes like a well-tube. F is a funnel and tube opening into the tube D E. Into this funnel is discharged (when convenient) a small stream of water, which fills the bottom of the tube at E, and passing through the holes in the bottom of the tube percolates through the earth, thus forming a good conductor of electricity into the earth. The top of the tube D should be elevated to a considerable height above the tank, and this tube should be erected at a considerable distance from the tank—the farther the better. C is a section of the gas-tube, made of glass, or rubber, or any other non-conductor, and may be of any desired length—the longer the better. This non-conducting tube is connected with the tube D E at H. The gas arising from the tank passes through the tube B C H into the tube D E, and into the air, and if a charge of electricity passes down it, when it reaches the metal tube D E, which is a better conductor than the tube B C H or the gas therein, it passes down D E into the earth at E.

When a stream of water cannot be obtained to run into the funnel F, care should be used that the tube D E is driven into the ground until it reaches moist earth, or the lower end of the tube D E may be an iron rod driven into the earth to moisture, and, what is better, connected by a metallic wire or rod with a water-course, so as to give a free discharge of electricity at the bottom E into the earth, away from the tank A.

What I claim as my invention, and desire to secure by Letters Patent, is—

1. In combination with an oil-tank, the lightning-conductor D E, and gas-escape tube B, the latter provided with the section C made of non-conducting material, substantially as and for the purpose specified.

2. The hollow lightning-conductor D, having the pointed and perforated end E, and funnel and tube F, for the introduction of water, substantially as and for the purpose specified.

JAMES A. SHERRIFF.

Witnesses:
A. B. RICHMOND,
JOSEPH T. WHITE.